United States Patent [19]
Fakieh

[11] Patent Number: 5,910,332
[45] Date of Patent: Jun. 8, 1999

[54] ROTISSERIE BROILER

[76] Inventor: Abdul Rahman Fakieh, Fakieh Center, Mekka, Saudi Arabia

[21] Appl. No.: 08/887,020

[22] Filed: Jul. 2, 1997

[51] Int. Cl.[6] .............................. A23C 3/00; A47J 37/08; A47J 37/04; A23L 3/00
[52] U.S. Cl. .............................. 426/523; 99/390; 99/391; 99/421 H; 99/427; 99/443 R; 99/447; 126/41 B
[58] Field of Search .............................. 99/427, 450, 448, 99/386, 373, 423, 443 C, 372, 443 R, 449, 379, 393, 389, 391, 395, 397, 421 H, 390, 447; 426/523; 126/3, 8, 25 R, 41 B, 41 D, 41 A, 25 AA, 25 A, 2

[56] References Cited

U.S. PATENT DOCUMENTS

| | | | |
|---|---|---|---|
| 1,358,365 | 11/1920 | De Matteis | 126/41 A |
| 2,821,187 | 1/1958 | Tescula | 126/25 |
| 3,316,831 | 5/1967 | Koland et al. | 99/261 |

*Primary Examiner*—David Lacey
*Assistant Examiner*—Drew Becker
*Attorney, Agent, or Firm*—Rudnick & Wolfe

[57] ABSTRACT

A rotary broiler assembly includes a rotisserie structure rotatable about a fixed axis. The rotisserie structure has a holding device radially spaced from the axis for holding a food item such as chicken thereon. When the rotisserie structure is rotated, the holding device revolves in an orbital fashion about the axis to define a path of orbital movement. A heat source is positioned within the path of orbital movement so that rotation of the rotisserie structure causes the food item to revolve about the heat source to thereby cook the food item.

27 Claims, 5 Drawing Sheets

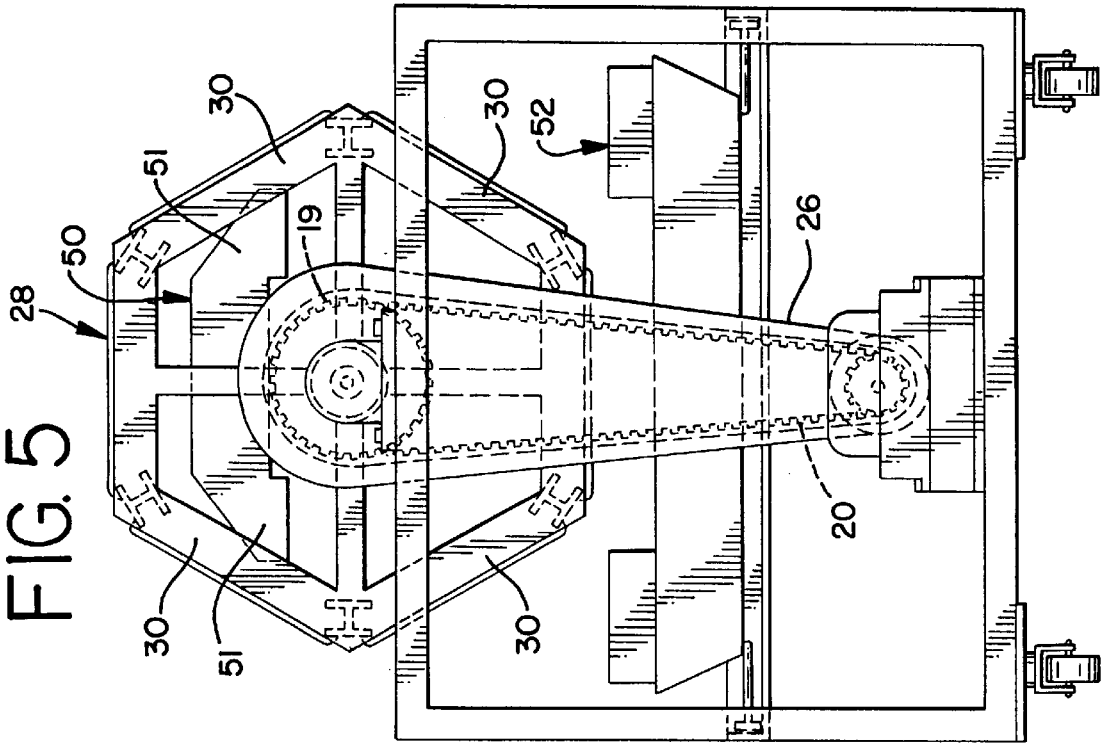
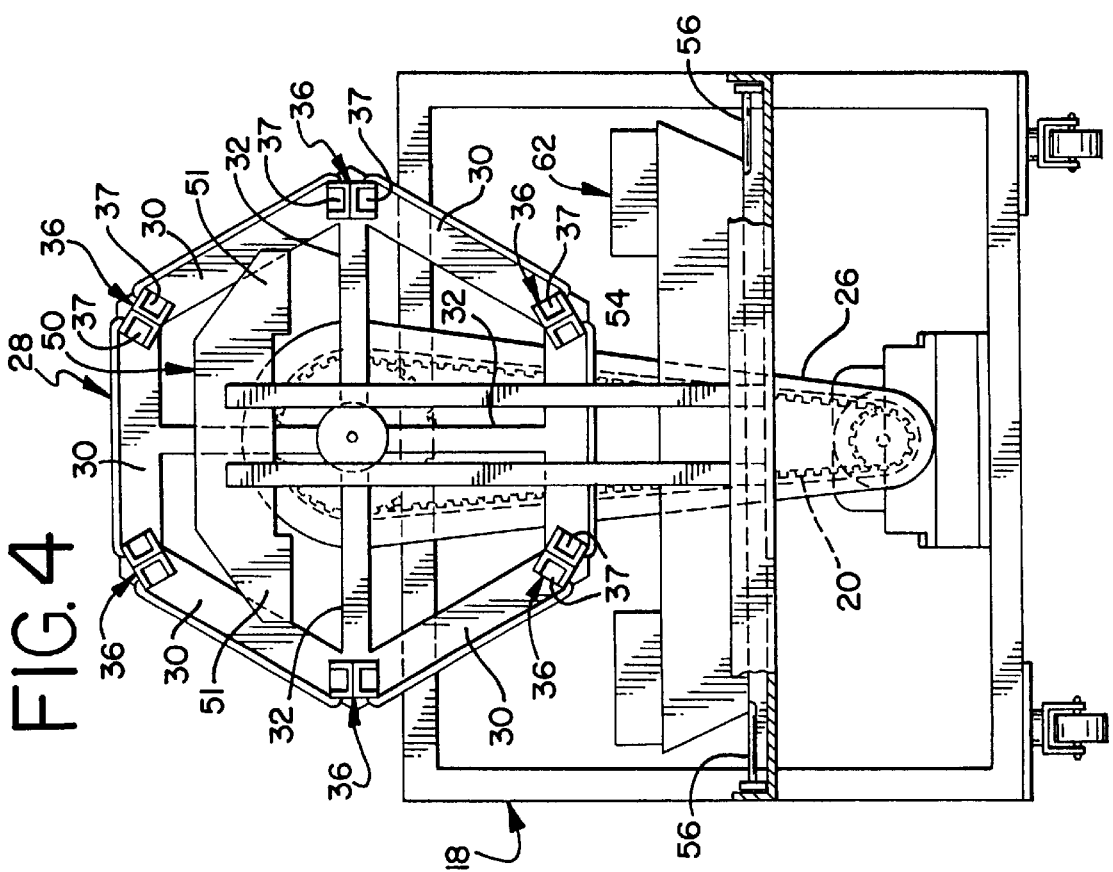

ROTISSERIE BROILER

FIELD OF THE INVENTION

The present invention relates generally to devices for cooking food items such as chicken, and more particularly, to a rotisserie charcoal broiler configured to revolve food items past one or more heat sources to provide even cooking and maximize the number of items which can be cooked at one time.

BACKGROUND OF THE INVENTION

Various types of grills and rotisserie devices are known in the art for progressively cooking each side of a food item such as meat or poultry. It is desirable to automatically turn the food item to provide even cooking, prevent burning, and to make it convenient for an operator to cook the item without having to manually rotate or turn the food item. In a commercial environment, it is also desirable to cook as many food items at one time in order to provide fast, efficient service to a customer.

In prior art rotisseries, however, a plurality of spits or skewers are typically rotated about their own axes and orbited about an oven. This is often accomplished by providing spaced drums or reel plates that are mutually rotated and horizontally support the skewers for rotary motion. Thus, the skewer ends are inserted in the driver that is attached to the reel plate and are connected to an associated planet gear or other mechanism that rotates the individual skewers. Attempts have been made to improve the planetary gearing system that serves to rotate each of the skewers about its own axis. Nevertheless, such systems tend to be complex and costly and have many parts which can perform improperly if clogged with debris, grease or the like. Moreover, the amount of food items that can be cooked at one time is limited because each skewer is intended to support a single "row" of food items.

Therefore, it remains desirable to provide a rotisserie device configured to maximize the number of food items that can be cooked at one time. It also remains desirable to provide an apparatus which can evenly cod machine elements such as planetary gear systems.

SUMMARY OF THE INVENTION

In view of the above, and in accordance with the present invention, there is provided a rotary broiler assembly including a rotisserie structure rotatable about a fixed axis. The rotisserie structure has a holding device radially spaced from the axis for holding a food item such as chicken thereon. When the rotisserie structure is rotated, the holding device revolves in an orbital fashion about the axis to define a path of orbital movement. A first heat source is positioned within the path of orbital movement so that rotation of the rotisserie structure causes the food item to revolve about the heat source to thereby cook the food item.

In one form of the invention, a second heat source is positioned outside said path of orbital movement such that rotation of the rotisserie structure causes the food item to move therepast. Preferably, the first heat source is an upper pan having charcoal therein and the second heat source is a lower pan having charcoal therein. Thus, the food item revolves in an orbital fashion to first pass above one of the pans of charcoal to cook one side of the food item, and to subsequently pass above the other pan of charcoal to cook another side of the food item. Also preferably, the rotisserie structure includes a plurality of parallel support tines spaced equally about the circumference of the orbital path of movement. In order to cook a large number of food items at the same time, a plurality of hinged food trays are configured to be releasably retained between adjacent support tines. Thus, the upper tray of charcoal can be completely surrounded by a plurality of food trays to maximize the number of food items which can be cooked at one time.

Also preferably, the upper and lower charcoal trays are configured as a unitary heating structure that can be moved as a unit toward and away from the rotisserie structure in a direction generally parallel to the axis of the rotisserie structure. This provides easy access to the upper and lower pans in order to ensure that the pans are continually filled with a desired amount of charcoal. In one embodiment of the invention, the heating structure is slidably mounted to a mainframe of the boiler assembly.

The present invention provides significant advantages over other rotisserie devices. The use of food trays which span a large area allows numerous food items to be cooked at one time. In addition, the use of upper and lower charcoal pans allows both sides of the food item to be cooked without having to employ complicated planetary gear systems.

The present invention, together with further objects and advantages, will be best understood by reference to the following detailed description taken in conjunction with the accompanying drawings.

BRIEF DESCRIPTION OF THE DRAWINGS

FIG. 4 is a front view of the rotary broiler assembly shown in FIG. 1;

FIG. 5 is a rear view of the rotary broiler assembly shown in FIG. 1;

DETAILED DESCRIPTION OF THE PREFERRED EMBODIMENT(S)

Figure 1:
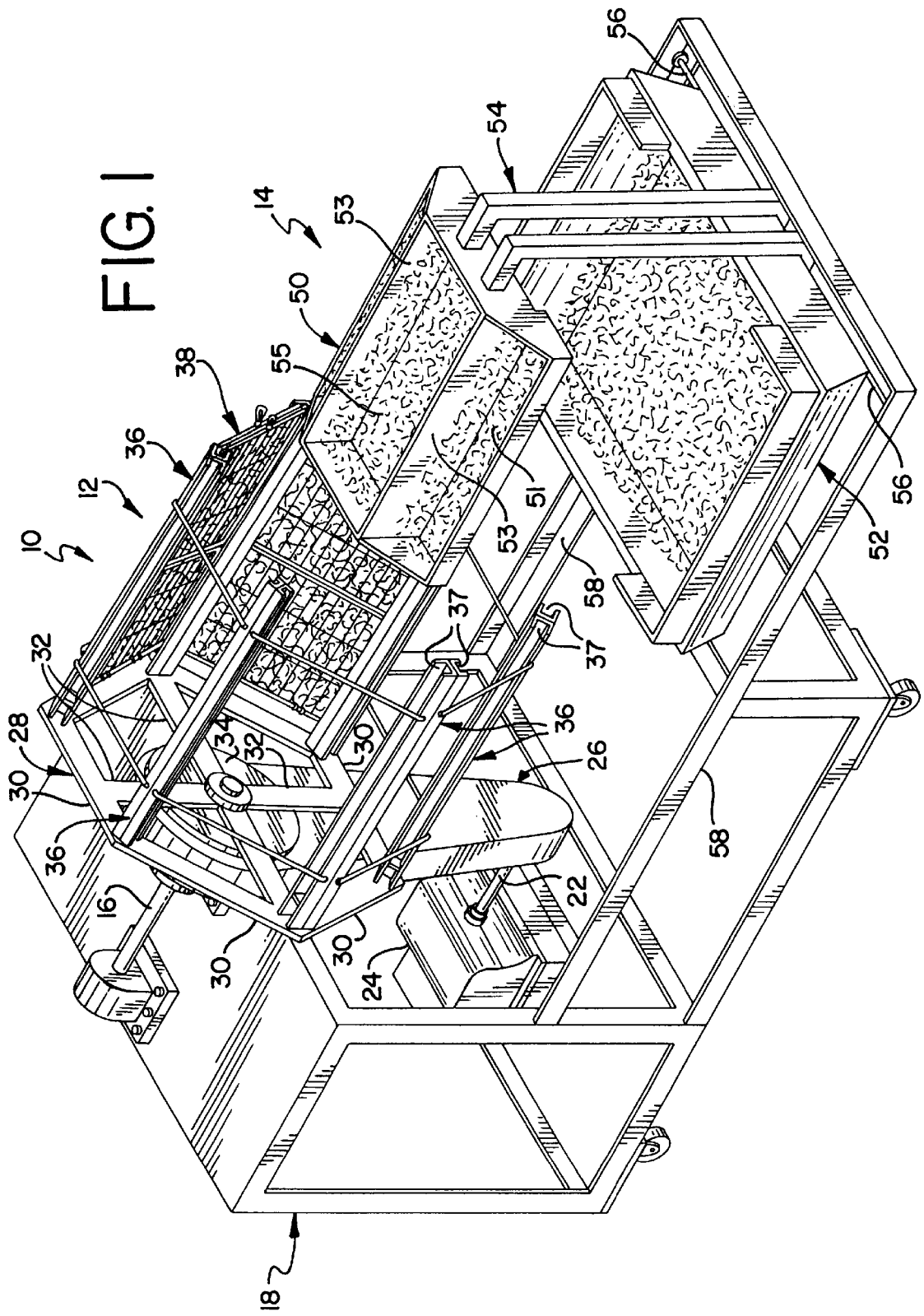
FIG. 1 is a perspective view of a rotary broiler assembly showing two stocked food braces loaded onto a rotisserie structure and a unitary heating structure pulled away from the rotisserie structure.

While the present invention is susceptible of embodiments in various forms, there is shown in the drawings and will hereinafter be described a preferred embodiment of the invention with the understanding that the present disclosure is to be considered as setting forth an exemplification of the invention which is not intended to limit the invention to the specific embodiment illustrated.

Referring now to the drawings, wherein like reference numerals refer to like parts throughout the several views, there is shown in FIG. 1 a rotary broiler assembly 10 including a rotisserie structure 12 and a heating unit 14. The rotisserie structure 12 is rotatable about a generally horizontal central axis defined by a rotisserie shaft 16, which is rotatably mounted on a frame 18. The rotisserie shaft 16 is driven by a pulley 19, which is in turn driven through a belt 20 by the shaft 22 of a motor 24. Preferably, the motor 24 is a ½ horsepower motor configured to operate at 16 rpm. Also preferably, the belt 20 is covered by a shroud 26 to protect the belt 20 from debris and to prevent an operator from inadvertently getting caught in the pulley arrangement.

As shown in the illustrated embodiment, the rotisserie structure 12 includes a hexagonal base 28 oriented in a generally vertical plane and configured for attachment to the rotisserie shaft 16. Preferably, the base 28 is defined by six equal length perimeter pieces 30 and four spokes 32 that extend radially outwardly from a central hub 34. The rotisserie shaft 16 is attached to the hub 34 to thereby provide for rotation of the rotisserie structure 12 at a generally constant speed. To hold a plurality of food items such as chicken in a desired orientation about the horizontal central axis, a plurality of parallel, cantilevered, support tines 36 extend horizontally forward from the junctions of the perimeter pieces 30 of the hexagonal base 28. Thus, the support tines 36 are spaced equally from each other and the central axis so that rotation of the rotisserie structure 12 causes the support tines 36 to revolve in an orbital path of movement about the central axis.

Figure 6:
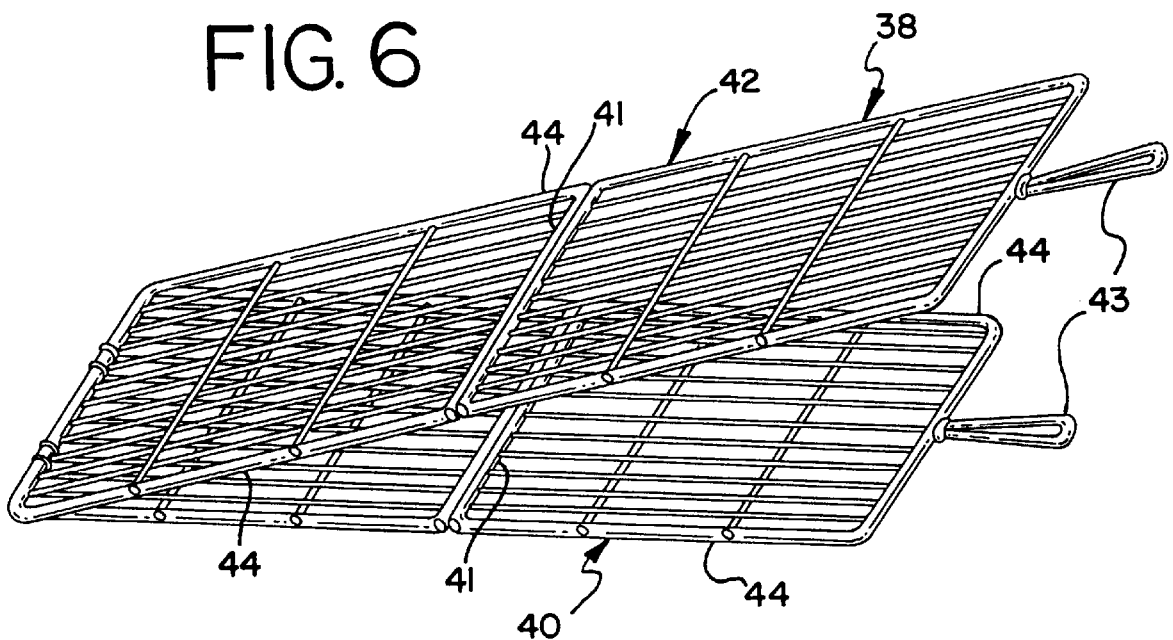
FIG. 6 is a perspective view of a hinged food brace shown partially open for the placement of food items therein.
Figure 7:
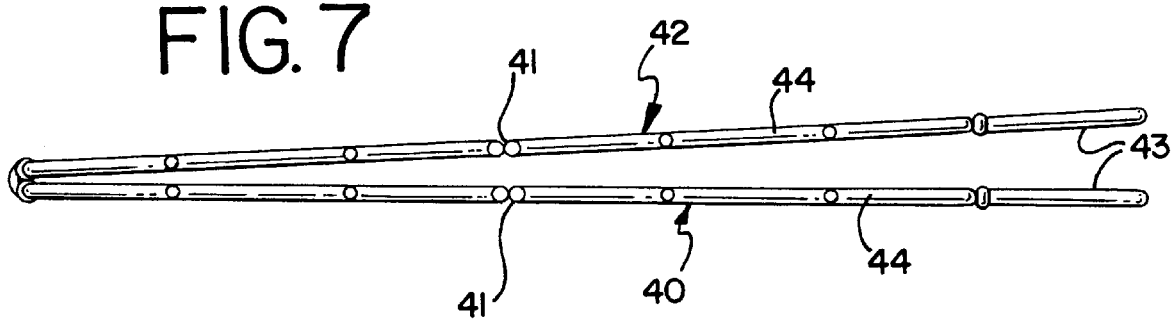
FIG. 7 is a side view of the food brace shown in FIG. 6.

Preferably, the support tines 36 are each configured with an I-shaped cross-section defining oppositely facing open channels 37 as shown in FIGS. 1 and 4 for slidably receiving a hinged food brace 38 (FIGS. 1–2 and 6–7). As shown in FIGS. 6 and 7, the food brace 38 includes a first wire frame 40 hingedly attached to a second wire frame 42 to allow food items to be placed between the wire frames 40, 42. Each wire frame 40, 42 is provided with a central hinge 41 and a handle 43 to facilitate closure of the frames 40, 42 when loaded with chicken or other food items. Thus, a large number of chickens or other food items can be placed in the food brace 38, which is subsequently placed between two of the support tines 36. Preferably, the wire frames 40, 42 have side edges 44 which are slidably placed into respective channels 37 of adjacent support tines 36. When placed in between two adjacent tines 36, the first and second wire frames 40, 42 are held together to prevent the food items from falling out of the food brace 38.

In order to cook an even larger number of food items at the same time, a plurality of hinged food braces 38 are stocked with food items and snugly placed between adjacent tines 36. Thus, the entire circumferential area defined by the support tines 36 can be filled with food items to create a cylinder-like food array that revolves around the central axis. Of course, any desired number of tines can be utilized within the spirit and scope of the present invention. For example, a square base unit can be provided with four tines extending forwardly from the corners thereof.

Figure 2:
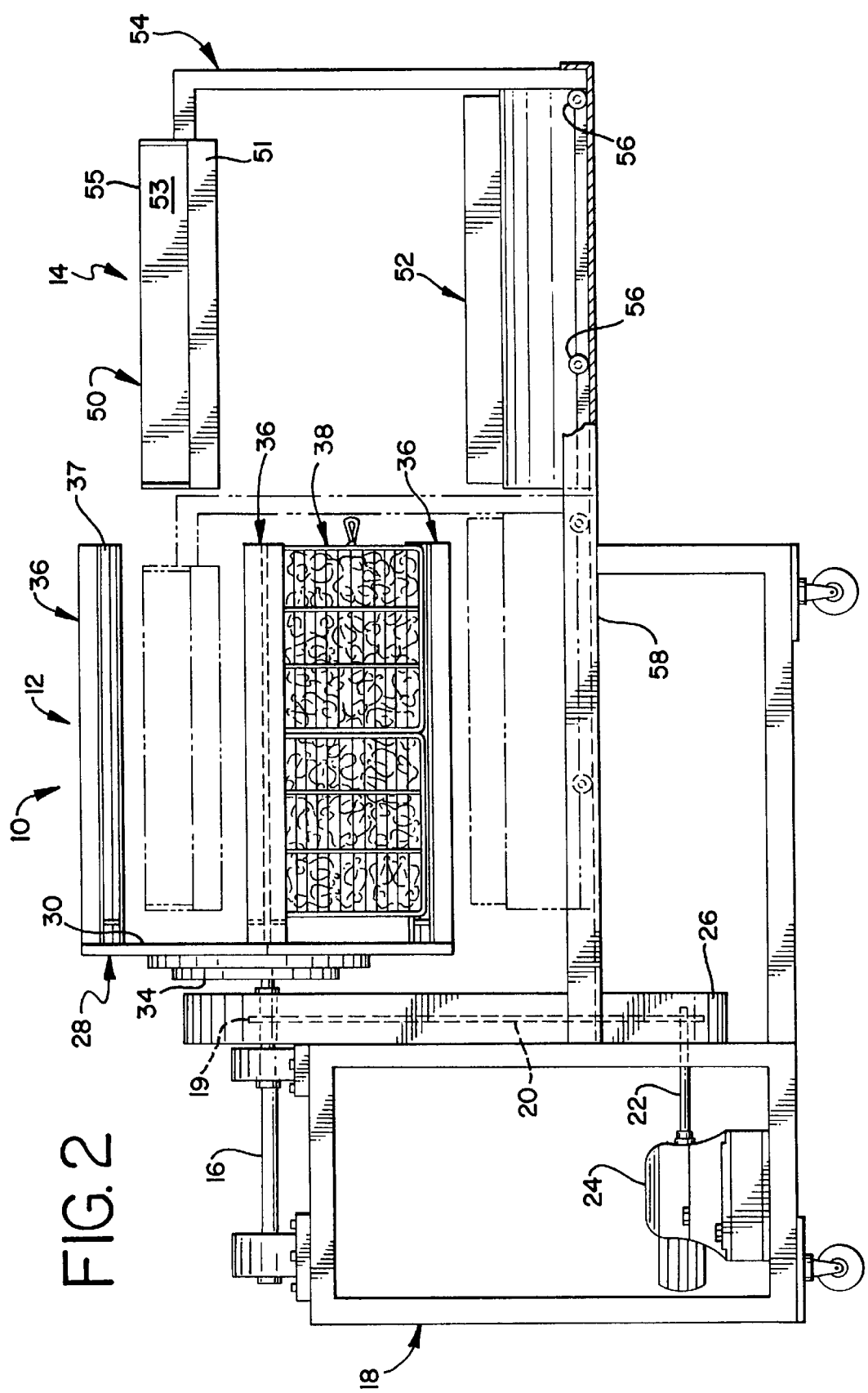
FIG. 2 is a side view of the rotary broiler assembly shown in FIG. 1.
Figure 3:
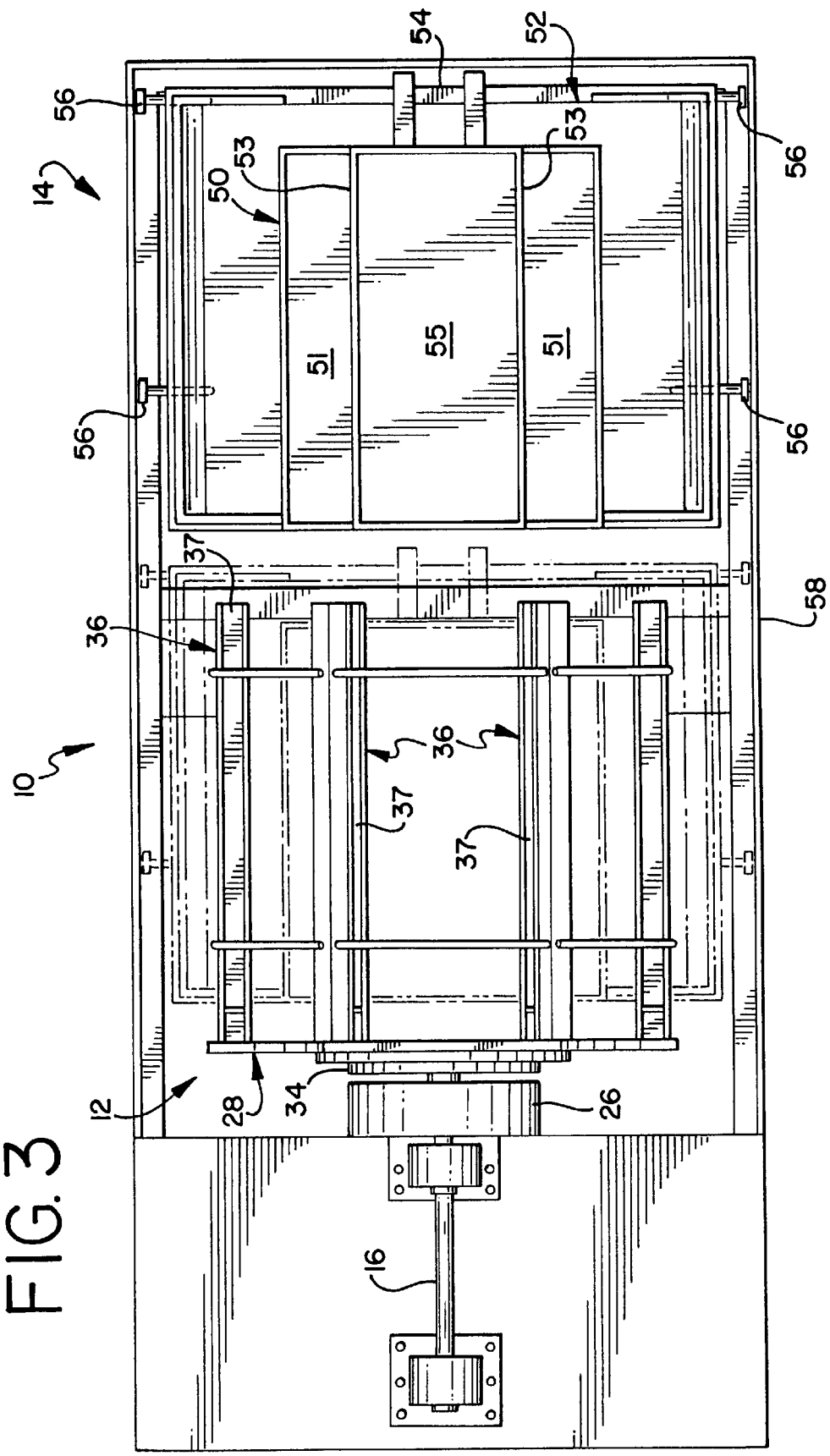
FIG. 3 is a top view of the rotary broiler assembly shown in FIG. 1.

To cook the food items as they revolve about the center axis, the heating unit 14 is moved into a desired position as shown in broken lines in FIGS. 2 and 3. Preferably, the heating unit 14 includes a generally horizontal upper pan 50 connected to a generally horizontal lower pan 52 by a pair of vertical support brackets 54. The pans 50 and 52 are spaced apart a desired distance so that the upper pan 50 can be moved into position within the orbital path of the support tines 36, food braces 38 and food items. Similarly, the spacing allows the lower pan 52 to be positioned outside and below the path of orbital movement. Preferably, upper pan 50 is configured with elongated sections 51 which are spaced below and adjacent side edges 53 of an enlarged central section 55. This facilitates cooking by approximating the circumference of the orbital movement of the food items, thereby increasing the effective cooking area and evenly spacing the charcoal from the food items.

During the cooking operation, a desired amount of charcoal is placed in the upper and lower pans 50, 52, and the rotisserie structure 12 is rotated to revolve the food items alternatively past the upper pan 50 and the lower pan 52. Thus, in the illustrated embodiment, the food items revolve in an orbital fashion to first pass above the upper pan 50 of charcoal to cook one side of the food item, and to subsequently pass above the lower pan 52 of charcoal to cook another side of the food item. If the food items are chickens, the chickens are preferably stocked so that the bone-side of the chickens face inwardly toward the upper pan 50 and the meat-side of the chickens face outwardly. Thus, the bone-side of each chicken passes above the upper pan 50, the chicken cools as it revolves from the upper pan 50 to the lower pan 52, and the meat-side of each chicken then passes over the lower pan 52. This arrangement maximizes the number of food items that can be cooked at one time, and also facilitates even cooking of the food item because both sides are being alternatively cooked and allowed to cool.

It will be appreciated by those skilled in the art that various other types of holding devices can be utilized rather than the precise multiple tine and food brace arrangement shown in the illustrated preferred embodiment. For example, one or more spits can be configured to receive several food items in "shish kabob" fashion and revolve about the center axis to provide the desired cooking characteristics. Also, the food items can be attached to a rotatable spit or other holding device so that they rotate while revolving about the central axis. Moreover, various other types of heating elements may be employed instead of charcoal, such as microwave, gas or electric devices.

Another aspect of the invention is the ability to move the heating unit 14 toward and away from the rotisserie structure 12. As illustrated, the lower pan 52 has a pair of front and rear roller assemblies 56 mounted thereon for operable engagment with corresponding tracks 58 on the frame, thereby allowing longitudinal movement of the heating unit 14 along the tracks 58. Alternatively, the lower pan 52 can have horizontal flanges extending laterally from the sides thereof for slidable engagement with the tracks 58, or the heating unit 14 can be mounted on a separate, stand-alone frame with wheels. In addition, the support tines 36 of rotisserie structure 12 are supported at the base 28 and open at the other end to allow the heating unit 14 to be moved into the operating position. Thus, the upper and lower pans 50 and 52 can be moved as a unit away from the rotisserie structure 12 to provide easy access and ensure that the pans 50, 52 are continually filled with a desired amount of charcoal.

Preferably, the length of the support tines 36 are equal to or greater than the length of the upper and lower charcoal pans 50, 52 so that an operator can easily load the food braces 38 while the heating unit 14 is in the operating position.

In operation of the foregoing preferred embodiment of the invention, an operator opens a food brace 38 and places food items such as chicken in between the wire frames 40, 42. When a tray 38 is full of chicken, the operator closes the tray 38 and slides the side edges 44 into the channels 37 of two adjacent support tines 36. If desired, the operator repeats this process five more times until six trays are loaded onto the rotisserie structure 12, thereby creating a cylindrically-shaped wall of chicken for cooking. The stocked trays 38 can be loaded while the rotisserie structure is rotating, or the motor can be turned off. In a fast-paced commercial environment, it is desirable to leave the rotisserie structure 12 rotating throughout the entire day and to continually remove trays when the chicken is cooked and load new trays in their place. At any point during this process, the heating unit 14 can be pulled away from the rotisserie structure 12 to add more charcoal and maintain a desired heating temperature. Thus, an efficient system is provided for evenly cooking a large amount of chicken at one time.

From the foregoing, it will be observed that numerous modifications and variations can be effected without departing from the true spirit and scope of the novel concept of the present invention. It will be appreciated that the present disclosure is intended as an exemplification of the invention, and is not intended to limit the invention to the specific embodiment illustrated. The disclosure is intended to cover by the appended claims all such modifications as fall within the scope of the claims.

What is claimed is:

1. A rotary broiler assembly comprising:
a rotisserie structure rotatable about a fixed axis and having a holding device radially spaced from said fixed axis for holding a food item thereon, whereupon rotation of the rotisserie structure causes the holding device to revolve in an orbital fashion about said fixed axis to define a path of orbital movement; and
a first heat source positioned within said path of orbital movement;
a second heat source positioned outside the path of orbital movement;
said first heat source and said second heat source comprising a heating structure configured to be simultaneously moved as a unit toward and away from said rotisserie structure in a direction generally parallel to the fixed axis of the rotisserie structure, thereby providing access for maintaining said first and second heat sources;
whereby rotation of the rotisserie structure causes the food item to revolve about the first heat source and past the second heat source, wherein said food item is fixed relative to the holding device so that the first heat source cooks one side of the food item and the second heat source cooks an opposite side of the food item as the food item revolves in said orbital fashion.

2. The rotary broiler assembly of claim 1 wherein said heating structure is slidable on a mainframe of the rotary broiler assembly.

3. The rotary broiler assembly of claim 2 wherein the first heat source comprises an upper pan having charcoal therein and the second heat source comprises a lower pan having charcoal therein, said upper and lower pans being connected by a bracket, and said lower pan having opposing sides slidably supported by corresponding rails of the mainframe.

4. The rotary broiler assembly of claim 1 wherein the rotisserie structure has a plurality of holding devices equally spaced from said fixed axis for holding a plurality of food items thereon.

5. A rotary broiler assembly comprising:
a rotisserie structure rotatable about a fixed horizontal axis and having a holding device radially spaced from said fixed horizontal axis for holding a food item thereon, whereupon rotation of the rotisserie structure causes the holding device to revolve in an orbital fashion about said fixed horizontal axis to define a path of orbital movement;
said rotisserie structure comprising a generally vertical base structure driven by a motor and at least two horizontal support tines extending perpendicularly therefrom, said at least two horizontal support tines being parallel to and equally spaced from said fixed horizontal axis and adapted to releasably retain a food brace for holding a plurality of food items thereon; and
a first heat source positioned within said path of orbital movement;
whereby rotation of the rotisserie structure causes the food item to revolve about the first heat source to thereby cook the food item.

6. The rotary broiler assembly of claim 5 further comprising a second heat source positioned outside said path of orbital movement such that rotation of the rotisserie structure causes the food item to move therepast, wherein said food item is fixed relative to the holding device so that the first heat source cooks one side of the food item and the second heat source cooks an opposite side of the food item as the food item revolves in said orbital fashion.

7. The rotary broiler assembly of claim 6 wherein the first heat source comprises an upper pan having charcoal therein and the second heat source comprises a lower pan having charcoal therein, said lower pan being positioned outside and below the path of orbital movement.

8. The rotary broiler assembly of claim 5 wherein the at least two horizontal support tines are each configured with an open-sided channel for slidably receiving said food brace.

9. The rotary broiler assembly of claim 8 wherein said food brace comprises a first wire frame hingedly attached to a second wire frame, wherein said food items are placed between said first and second wire frames, and side edges of said first and second wire frames are slidably placed into the channels of the at least two horizontal support tines.

10. The rotary broiler assembly of claim 5 further comprising a plurality of said horizontal support tines spaced equally about the circumference of the orbital path of movement, and further comprising a plurality of food braces adapted to be releasably retained between adjacent one of said horizontal support tines, wherein the first heat source is completely surrounded by a plurality of food braces to maximize the number of food items which can be cooked at one time.

11. The rotary broiler assembly of claim 10 wherein the plurality of horizontal support tines are each configured with an I-shaped cross-section defining oppositely facing channels for slidably receiving corresponding side edges of the plurality of food braces.

12. The rotary broiler assembly of claim 5 wherein said first heat source is configured to slide toward and away from said rotisserie structure in a direction generally parallel to the fixed horizontal axis of the rotisserie structure.

13. A rotary broiler assembly comprising:
a rotisserie structure rotatable about a fixed axis and having a holding device radially spaced from said fixed axis for holding a food item thereon, whereupon rotation of the rotisserie structure causes the holding device to revolve in an orbital fashion about said fixed axis to define a path of orbital movement;
a first heat source positioned within said path of orbital movement;
a second heat source positioned outside said path of orbital movement;
said first and second heat sources configured to be moved toward and away from said rotisserie structure in a direction generally parallel to the fixed axis of the rotisserie structure thereby providing access for maintaining said first and second heat sources;
whereby rotation of the rotisserie structure causes the food item to revolve about the first heat source and move past the second heat source so that one side of the food item is intermittently exposed to the first heat source and the opposite side of the food item is intermittently exposed to the second heat source.

14. The rotary broiler assembly of claim 13 wherein the first heat source comprises an upper pan having charcoal therein and the second heat source comprises a lower pan having charcoal therein, said lower pan being positioned outside and below the path of orbital movement.

15. The rotary broiler assembly of claim 14 wherein the upper and lower pans are connected by a bracket to define a heating structure configured to be simultaneously moved as a unit.

16. The rotary broiler assembly of claim 13 wherein the rotisserie structure comprises a generally vertical base structure driven by a motor and at least two horizontal support tines extending perpendicularly therefrom, said at least two horizontal support tines being parallel to and equally spaced from said fixed axis and adapted to releasably retain a food brace for holding a plurality of food items thereon.

17. The rotary broiler assembly of claim 16 wherein said food brace comprises a first wire frame hingedly attached to a second wire frame, wherein said plurality of food items are placed between said first and second wire frames, and side edges of said first and second wire frames are slidably placed into channels of the at least two horizontal support tines.

18. The rotary broiler assembly of claim 16 further comprising a plurality of said horizontal support tines spaced equally about a circumference of the orbital path of movement, and further comprising a plurality of food braces adapted to be releasably retained between adjacent ones of said horizontal support tines, wherein the first heat source is completely surrounded by a plurality of food braces to maximize the number of food items which can be cooked at one time.

19. The rotary broiler assembly of claim 18 wherein the plurality of horizontal support tines are each configured with an I-shaped cross-section defining oppositely facing channels for slidably receiving corresponding side edges of the food braces.

20. A rotary broiler assembly comprising:

a plurality of food braces each adapted to hold a plurality of food items thereon;

a rotisserie structure rotatable about a fixed horizontal axis and having a plurality of horizontally extending support tines spaced equally from each other and spaced an equal radial distance from said horizontal fixed axis, said plurality of horizontally extending support tines being configured to releasably retain food braces therebetween such that said fixed horizontal axis is completely surrounded by a plurality of food braces to maximize the number of food items which can be cooked at one time, whereupon rotation of the rotisserie structure causes the plurality of horizontally extending support tines and the food braces to revolve in an orbital fashion about said fixed horizontal axis to define a path of orbital movement;

an upper pan having charcoal therein and positioned within said path of orbital movement;

a lower pan having charcoal therein and positioned outside and below said path of orbital movement;

whereby rotation of the rotisserie structure causes one side of each of the food items to intermittently pass over the charcoal in the upper pan and the other side of each of the food items to intermittently pass over the charcoal in the lower pan to thereby cook both sides of the food items.

21. The rotary broiler assembly of claim 20 wherein the upper and lower pans are connected by a bracket to define a heating structure configured to be simultaneously moved as a unit toward and away from said rotisserie structure in a direction generally parallel to the fixed horizontal axis of the rotisserie structure, thereby providing access for maintaining said first and second heat sources.

22. The rotary broiler assembly of claim 20 wherein said food braces comprise a first wire frame hingedly attached to a second wire frame, wherein said food items are placed between said first and second wire frames, and side edges of the first and second wire frames are slidably placed into channels of the horizontally extending support tines.

23. The rotary broiler assembly of claim 22 wherein the horizontally extending support tines are each configured with an I-shaped cross-section defining oppositely facing channels for slidably receiving corresponding side edges of the food braces.

24. The rotary broiler assembly of claim 20 wherein the upper and lower pans are configured to be moved toward and away from said rotisserie structure in a direction generally parallel to the fixed axis of the rotisserie structure, thereby providing access for maintaining said first and second heat sources.

25. A method of cooking food items comprising:

providing a rotisserie structure rotatable about a fixed axis and having a holding device radially spaced from said fixed axis for holding a food item thereon, whereupon rotation of the rotisserie structure causes the holding device to revolve in an orbital fashion about said fixed axis to define a path of orbital movement; and moving a first heat source in a longitudinal direction toward said rotisserie structure from a position outside said path of orbital movement to a position within said path of orbital movement;

rotating the rotisserie structure to cause the food item to revolve about the first heat source to thereby cook the food item.

26. The method of claim 25 further comprising the step of simultaneously moving a second heat source in said longitudinal direction toward the rotisserie structure from a position longitudinally spaced from the rotisserie structure to a position adjacent and outside said path of orbital movement.

27. The method of claim 26 wherein the first heat source comprises an upper pan having charcoal therein and the second heat source comprises a lower pan having charcoal therein, said lower pan being positioned outside and below the path of orbital movement.

* * * * *